(12) United States Patent
Connolly et al.

(10) Patent No.: US 8,817,824 B2
(45) Date of Patent: Aug. 26, 2014

(54) OPTICAL TRANSPORT NETWORK LINE MANAGEMENT SYSTEM AND METHODS

(75) Inventors: Matthew W. Connolly, Canton, GA (US); Vagish Madrahalli, Woodstock, GA (US); Richard W. Conklin, Gainesville, GA (US); Jeffrey S. Moynihan, Cumming, GA (US)

(73) Assignee: Ciena Corporation, Hanover, MD (US)

( * ) Notice: Subject to any disclaimer, the term of this patent is extended or adjusted under 35 U.S.C. 154(b) by 215 days.

(21) Appl. No.: 13/309,959

(22) Filed: Dec. 2, 2011

(65) Prior Publication Data

US 2013/0142509 A1    Jun. 6, 2013

(51) Int. Cl.
*H04J 3/04* (2006.01)

(52) U.S. Cl.
USPC .......................... 370/535; 370/477

(58) Field of Classification Search
USPC .................. 370/535; 398/44, 22, 5
See application file for complete search history.

(56) References Cited

U.S. PATENT DOCUMENTS

| | | | |
|---|---|---|---|
| 5,452,286 A * | 9/1995 | Kitayama | 370/228 |
| 7,778,236 B2 | 8/2010 | Yu | |
| 7,970,008 B2 | 6/2011 | Kisaka et al. | |
| 2004/0213227 A1 * | 10/2004 | Pierson, Jr. | 370/389 |
| 2007/0116061 A1 | 5/2007 | Meagher et al. | |
| 2007/0189336 A1 | 8/2007 | Zou | |
| 2007/0248121 A1 | 10/2007 | Zou | |
| 2008/0181203 A1 | 7/2008 | Jones et al. | |
| 2008/0201105 A1 | 8/2008 | Hermsmeyer et al. | |
| 2008/0247550 A1 * | 10/2008 | Kozaki et al. | 380/278 |
| 2009/0162061 A1 | 6/2009 | Kisaka et al. | |
| 2010/0054731 A1 | 3/2010 | Oltman et al. | |
| 2010/0272438 A1 | 10/2010 | Conklin et al. | |
| 2011/0170860 A1 | 7/2011 | Smith et al. | |
| 2011/0262128 A1 | 10/2011 | Madrahalli et al. | |
| 2013/0136446 A1 * | 5/2013 | Hotchkiss et al. | 398/22 |
| 2014/0016925 A1 * | 1/2014 | Ceccarelli et al. | 398/5 |

* cited by examiner

*Primary Examiner* — Andrew Lai
*Assistant Examiner* — Jamaal Henson
(74) *Attorney, Agent, or Firm* — Clements Bernard PLLC; Christopher L. Bernard; Lawrence A. Baratta, Jr.

(57) ABSTRACT

An Optical Transport Network (OTN) mode management system includes a controller communicatively coupled to at least one OTN port. The controller is configured to operate an OTN line Optical channel Data Unit level k (ODUk) mode management system for the at least one OTN port, and the OTN line ODUk mode management system is configured to support different multiplexing scenarios on the OTN port with no loss of control plane packets on aggregated links. A network element includes at least one port with a plurality of lines associated therewith, a controller communicatively coupled to the at least one port, and an OTN line ODUk mode management system executed on the controller for managing the plurality of lines on the at least one port. A method includes configuring and dynamically managing modes of a plurality of OTN lines in a link.

17 Claims, 6 Drawing Sheets

OPTICAL TRANSPORT NETWORK LINE MANAGEMENT SYSTEM AND METHODS

FIELD OF THE INVENTION

Generally, the field of art of the present disclosure pertains to optical networking systems and methods, and more particularly, to Optical Transport Network (OTN) Line Optical channel Data Unit level k (ODUk) mode management.

DESCRIPTION OF THE BACKGROUND ART

Conventionally, Optical Transport Network (OTN), defined in inter alia ITU G.709/Y.1331 (December 2009) "Interfaces for the Optical Transport Network (OTN)," the contents of which are herein incorporated by reference, allows network operators to converge networks through seamless transport of the numerous types of legacy protocols while providing the flexibility required to support future client protocols. OTN may support switching, multiplexing, and/or mapping of signals in a number of ways. Switching between certain multiplex options involves building ODUkj (k, j=0, 1, 2, 2e, 3, flex, 4, . . . ) trail terminations; requiring re-programming of hardware devices which can bring an Optical channel Transport Unit level k (OTUk) interface down for a short period of time. If a configuration change is drastic, it may be necessary to re-program a Field Programmable Gate Array (FPGA). Application Specific Integrated Circuit (ASIC), etc. on the equipment. That is, typically some combination of framer, switch fabric, or other connecting points (Fabric Interface, Alignment Unit, etc) are a reprogrammed. These may be FPGAs, custom ASICs, or commercially available components. For control plane and mesh restoration, protocols have been developed to deal with in-band packet loss during minor re-configuration; but this increases switch times and switch time variability. Another problem exists for ODUk switching on OTUk lines. Conventionally, when a connection is established or when a timing reference changes, a frame slip occurs. A frame slip occurs when the timing reference or frame source (i.e., Multi-Frame Alignment Signal (MFAS)) changes. This can occur when a connection is established but it does not always happen when a connection is established and there are other events (not related to connection establishment) that can cause a frame slip. Frame slips in this configuration may also originate outside the network. While a frame is lost, it is possible to lose control plane packets. In view of the foregoing, there exists a need to address the OTN frame slip problem to improve integrity of OTU and ODUk overhead during a mode change. There also exists needs in OTN to address ODUk in-band communication problem for OTU and ODUk overhead for an ODUk cross connect mode and real time performance problems of mode changes between an ODUk Connection Termination Point (CTP) mode and an ODUk Trail Termination Point (TTP) mode and vice versa.

BRIEF SUMMARY OF THE INVENTION

In an exemplary embodiment, an Optical Transport Network (OTN) mode management system includes a controller communicatively coupled to at least one OTN port, the controller is configured to operate an OTN line Optical channel Data Unit level k (ODUk) mode management system for the at least one OTN port, and the OTN line ODUk mode management system is configured to support different multiplexing scenarios and transitions associated therewith on the OTN port while maintaining in-band communications. The transitions of the different multiplexing scenarios on the OTN port is provided on one of aggregated links and a single line. The OTN line ODUk mode management system may be configured to pre-configure lines associated with the at least one OTN port thereby decreasing switch times associated therewith. The OTN line ODUk mode management system may be configured to manage a mode of a plurality of lines associated with the at least one OTN port. The mode may include one of a Connection Termination Point (CTP), a Trail Termination Point (TTP), or a hierarchy of TTPs ODUi,j,k.

The controller may be further configured to implement a control plane, and wherein the control plane selects at least one line of the plurality of lines for routing and signaling messages based on ODUk frame termination and generation thereon. The OTN line ODUk mode management system may be configured to dynamically adjust the mode of the plurality of lines to maintain a desired percentage mix thereon. The OTN line ODUk mode management system may be configured to apply a default mode to a last idle line of the plurality of lines. The controller may be configured to perform a mode change on one of the plurality of lines while preventing an OTN frame slip thereon. The controller may be configured to perform a mode change on one of the plurality of lines while preventing loss of in-band communication channels thereon.

In another exemplary embodiment, a network element with OTN Line ODUk mode management includes at least one port with a at least one line associated therewith; a controller communicatively coupled to at least one port; and an OTN line ODUk mode management system executed on the controller for managing the at least one line on at least one port; wherein the OTN line ODUk mode management system is configured to support different multiplexing scenarios on at least one port with continuity of control plane packets during mode changes. The OTN line ODUk mode management system may be configured to pre-configure the at least one line associated with at least one port thereby decreasing switch times associated therewith. The OTN line ODUk mode management system may be configured to manage a mode of at the least one line. The mode may include one of a Connection Termination Point (CTP) and a Trail Termination Point (TTP).

The controller may further configured to implement a control plane, and wherein the control plane selects at least one line of the at least one line for routing and signaling messages based on ODUk frame termination and generation thereon. The OTN line ODUk mode management system may be configured to dynamically adjust the mode of the at least one line to maintain a desired percentage mix thereon. The OTN line ODUk mode management system may be configured to apply a default mode to a last idle line of the at least one line. The controller may be configured to perform a mode change on one of the at least one line while preventing an OTN frame slip thereon. The controller may be configured to perform a mode change on one of the at least one line while preventing loss of in-band communication channels thereon.

In yet another exemplary embodiment, a method for OTN Line ODUk mode management includes applying a default mode for Optical channel Transport Unit (OTU) lines; configuring a percentage of lines in a link in a first mode and a second mode; as the lines in the link are filled, dynamically adjusting the percentage of lines in the link between the first mode and the second mode; and applying a default mode including one of the first mode and the second mode to a last idle line of the link. The mode may include one of a Connection Termination Point (CTP) and a Trail Termination Point (TTP).

BRIEF DESCRIPTION OF THE SEVERAL VIEWS OF THE DRAWING(S)

Exemplary and non-limiting embodiments of the present disclosure are illustrated and described herein with reference to various drawings, in which like reference numbers denote like method steps and/or system components, respectively, and in which.

DETAILED DESCRIPTION OF THE INVENTION

In various exemplary embodiments, Optical Transport Network (OTN) Line Optical channel Data Unit level k (ODUk) mode management systems and methods are described. The OTN Line ODUk mode management systems and methods allow support for different types of multiplexing scenarios with minimal hardware re-configuration, and therefore no loss of control plane packets on aggregated links. Variously, the OTN Line ODUk mode management systems and methods minimize hardware re-configuration that results in a timing and/or framing source changes. The hardware re-configuration required for a mesh restoration involves a switch fabric reprogramming and framer time-slot information reprogramming that is similar with and without the invention. The OTN Line ODUk mode management systems and methods advantageously applies re-configurations in a way that minimizes timing and/or framing source changes to hardware. The OTN Line ODUk mode management systems and methods also decrease switch times on aggregated links, since hardware is pre-configured to support multiple cases. A distribution of modes (i.e., CTP, TTP) may be set to match carriers anticipated network demands. Also, the OTN Line ODUk mode management systems and methods allow a control plane to select a line or lines within a link for routing and signaling messages such that the line(s) selected are configured for ODUk frame termination/generation and are therefore not subject to errors introduced by frame slips caused by switching events outside the network. Additionally, by pre-programming some ports as TTP and some as CTP with the OTN Line ODUk mode management systems and methods, drastically lower traffic restoration time may be achieved. Subnetwork Connections (SNCs) requiring a TTP may be sent to the TTP ports and SNCs requiring CTPs can be sent to the CTP ports.

Figure 1:
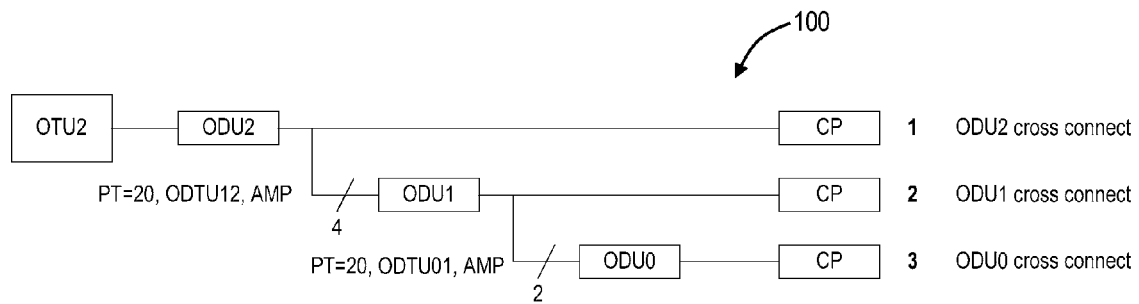
FIG. 1 is a multiplexing diagram of multi-level multiplexing on an OTU2 port.
Figure 2:
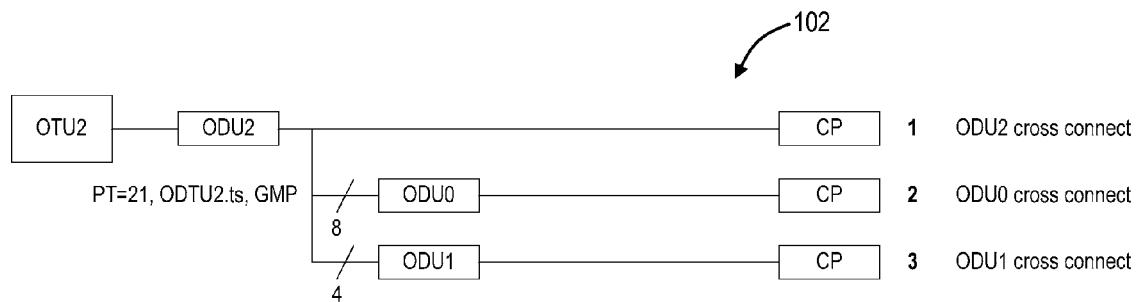
FIG. 2 is a multiplexing diagram of single-level flat multiplexing on an OTU2 port.
Figure 3:
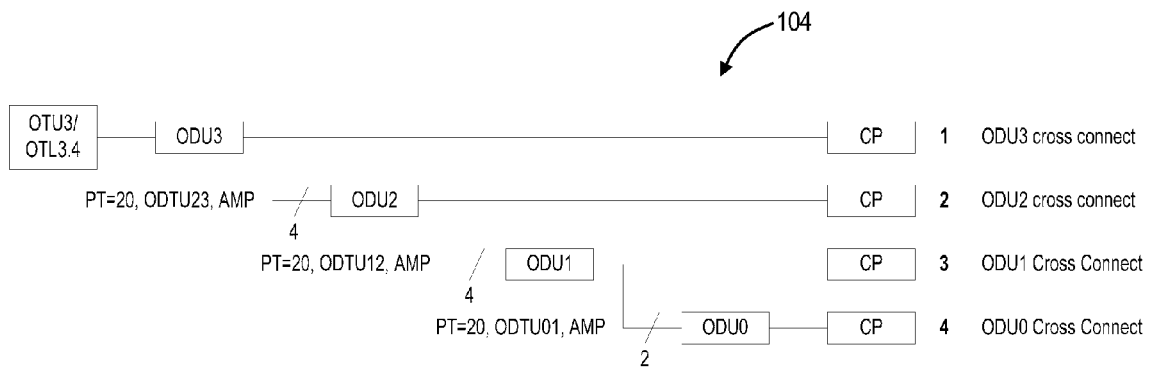
FIG. 3 is a multiplexing diagram of multi-level step multiplexing on an OTU3 port.
Figure 4:
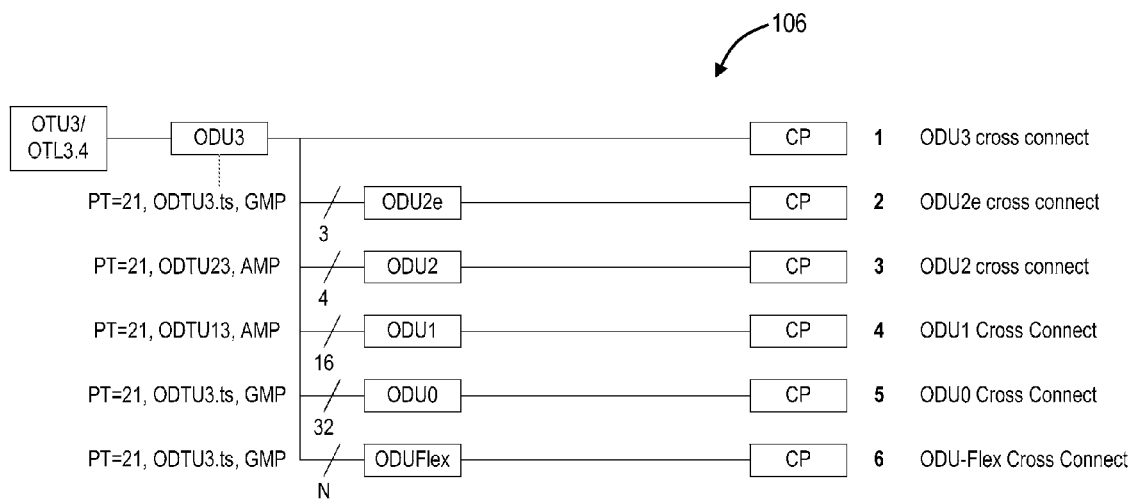
FIG. 4 is a multiplexing diagram of single-level flat multiplexing on an OTU3 port.

Referring to FIGS. 1, 2, 3, and 4, in various exemplary embodiment, a multiplexing diagram illustrates exemplary multiplexing 100, 102, 104, 106 in OTN. FIG. 1 illustrates a multi-level multiplexing 100 on an OTU2 port from a connection point (CP). The multi-level multiplexing 100 includes switching and/or multiplexing options of an ODU2 into an OTU2, 4×ODU1 into an ODU2 into an OTU2, and 2×ODU0 into an ODU1 into an ODU2 into an OTU2. FIG. 2 illustrated a single-level flat multiplexing 102 on an OTU2 port. The single-level multiplexing 102 includes switching and/or multiplexing options of an ODU2 into an OTU2, 8×ODU0 into an ODU2 into an OTU2, and 4×ODU1 into an ODU2 into an OTU2. FIG. 3 illustrates a multi-level step multiplexing 104 on an OTU3 port. The multi-level step multiplexing 104 includes switching and/or multiplexing options of an ODU3 into an OTU3, 4×OD2 into an ODU3 into an OTU3, 4×ODU1 into an ODU2 into an ODU3 into an OTU3, and 2×ODU0 into an ODU1 into an ODU2 into an ODU3 into an OTU3. FIG. 4 illustrates a single-level flat multiplexing 106 on an OTU3 port. The single-level flat multiplexing 106 includes switching and/or multiplexing options of an ODU3 into an OTU3, 3×ODU2e into an ODU3 into an OTU3, 4×ODU2 into an ODU3 into an OTU3, 16×ODU1 into an ODU3 into an OTU3, 32×ODU0 into an ODU3 into an OTU3, and N×ODU-Flex (N being an integer) into an ODU3 into an OTU3.

As described herein, switching between certain multiplex options, such as in the multiplexing 100, 102, 104, 106, involves building ODUkj trail terminations; requiring re-programming of hardware devices which can bring the OTUk interface down for a short period of time. If configuration change is drastic, it may be necessary to re-program an FPGA, ASIC, etc. on the equipment requiring timing and/or frame source changes. Of note, each of the multiplexing 100, 102, 104, 106 examples represents an FPGA, ASIC, etc. load. For control plane and mesh restoration, protocols have been developed to deal with in-band packet loss during minor re-configuration; but this increases switch times and switch time variability.

Figure 5:
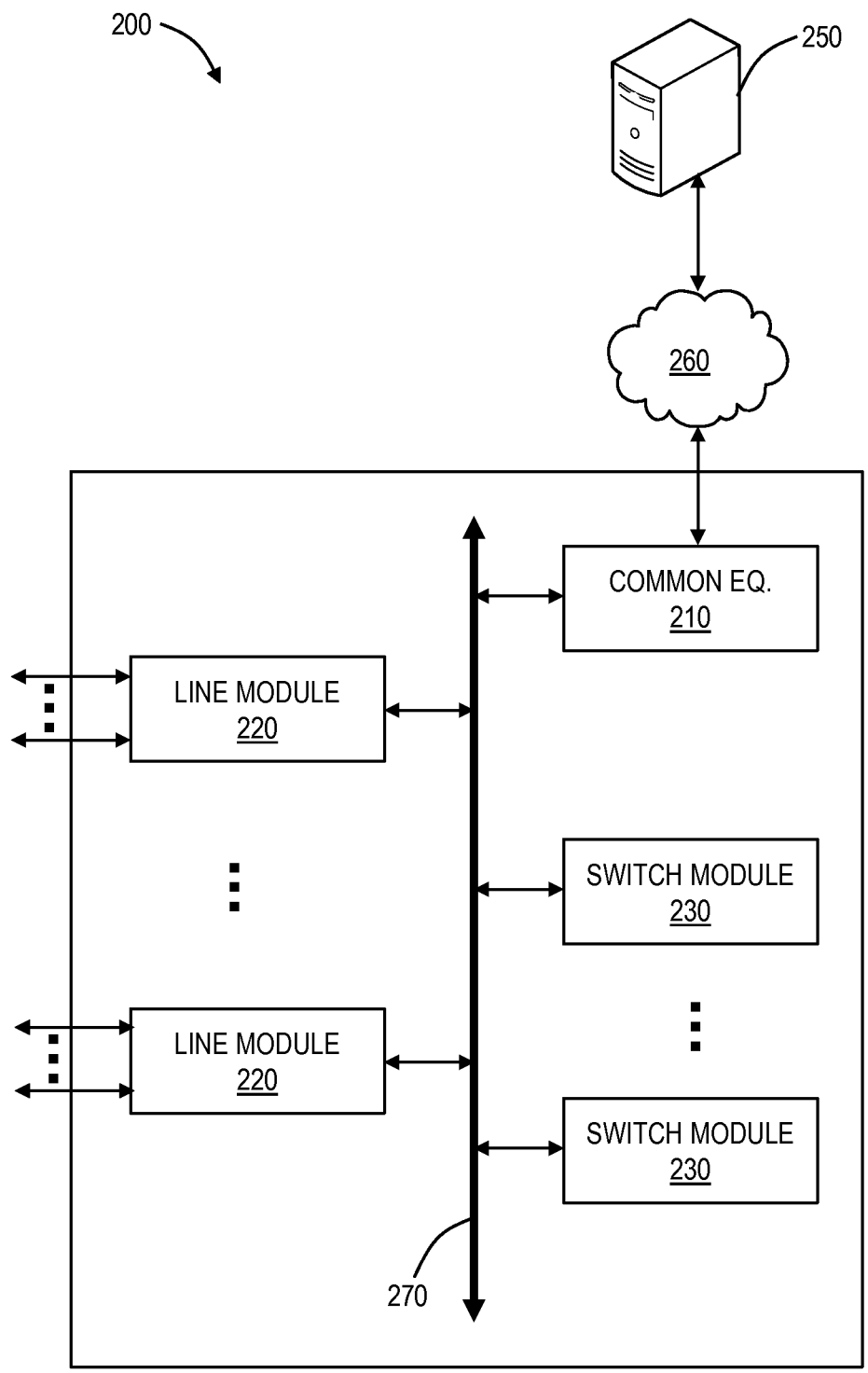
FIG. 5 is a block diagram of an exemplary optical network element for implementation of OTN Line ODUk mode management systems and methods.

Referring to FIG. 5, in an exemplary embodiment, a block diagram illustrates an exemplary optical network element 200 for implementation of OTN Line ODUk mode management systems and methods. In an exemplary embodiment, the network element 200 is a nodal device that may consolidate the functionality of a multi-service provisioning platform (MSPP), digital cross connect (DCS), Ethernet and Optical Transport Network (OTN) switch, dense wave division multiplexed (DWDM) platform, etc. into a single, high-capacity intelligent switching system providing Layer 0, 1, and 2 consolidation. In another exemplary embodiment, the network element 200 may include an OTN add/drop multiplexer (ADM), a multi-service provisioning platform (MSPP), a digital cross-connect (DCS), a switch, a router, etc. In an exemplary embodiment, the network element 200 includes common equipment 210, one or more line modules (LM) 220, and one or more switch modules (SM) 230. The common equipment 210 may include power; a control module; operations, administration, maintenance, and provisioning (OAM&P) access; and the like. The common equipment 210 may connect to a management system 250 through a data communication network 260. The management system 250 may include a network management system (NMS), element management system (EMS), or the like. The OTN Line ODUk mode management systems and methods described herein may include operation through the management system 250 and/or the common equipment 210 for various OTN lines, ports, etc. on the lines modules 220 and/or the switch modules 230. Additionally, the common equipment 210 may include a control plane processor configured to operate a control plane and the systems and methods described herein.

The network element 200 may include an interface 270 for communicatively coupling the common equipment 210, the line modules 220, and the switch modules 230 therebetween. For example, the interface 270 may include a backplane, mid-plane, a bus, optical or electrical connectors, or the like. The line modules 220 are configured to provide ingress and egress to the network element 200 and/or to the switch modules 230, and are configured to provide interfaces for the OTN services described herein. In an exemplary embodiment, the line modules 220 may form ingress and egress switches with the switch modules 230 as center stage switches for a three-stage switch, e.g. a three stage Clos switch. Alternatively, the modules 220, 230 may form a five-stage switch. The line modules 220 may include optical transceivers, such as, for example, 1 Gb/s (GbE PHY), 2.5 Gb/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), etc. Further, the line modules 220 may include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s. The line modules 220 may include DWDM interfaces, short reach interfaces, and the like, and may connect to other line modules 220 on remote network elements, end clients, the edge routers, and the like. From a logical perspective, the line modules 220 provide ingress and egress ports to the network element 200, and each line module 220 may include one or more physical ports.

The switch modules 230 are configured to switch services between the line modules 220. For example, the switch modules 230 may provide switching at a wavelength granularity (Layer 0 switching), SONET/SDH granularity such as Synchronous Transport Signal-1 (STS-1), Synchronous Transport Module level 1 (STM-1), Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical channel Payload Virtual Containers (OPVCs), etc.; Ethernet granularity; Digital Signal n (DSn) granularity such as DS0, DS1, DS3, etc.; and the like. Specifically, the switch modules 230 may include both Time Division Multiplexed (TDM) (i.e., circuit switching) and packet switching engines. The switch modules 230 may include redundancy as well, such as 1:1, 1:N, etc. Those of ordinary skill in the art will recognize the network element 200 may include other components which are omitted for simplicity, and that the systems and methods described herein are contemplated for use with a plurality of different network elements with the network element 200 presented as an exemplary type of network element. For example, in another exemplary embodiment, the network element 200 may not include the switch modules 230, but rather have the corresponding functionality in the line modules 220 (or some equivalent) in a distributed fashion. Thus, for the network element 200, other architectures providing ingress, egress, and switching therebetween are also contemplated for the systems and methods described herein.

Figure 6:
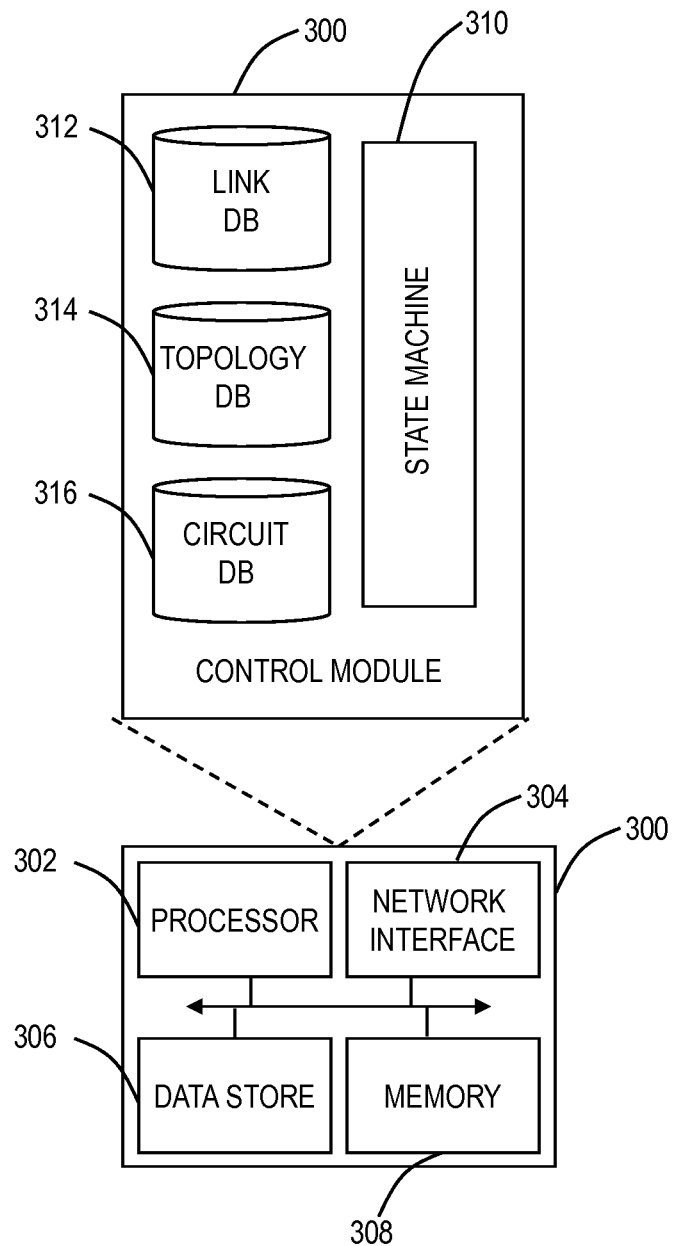
FIG. 6 is a block diagram of a control module to provide control plane processing and operations, administration, maintenance, and provisioning (OAM&P) for a network element.

Referring to FIG. 6, in an exemplary embodiment, a block diagram illustrates a control module 300 to provide control plane processing and/or OAM&P for a node such as the network element 200. The control module 300 may be part of common equipment, such as common equipment 210 in the network element 200. The control module 300 may include a processor 302 which is hardware device for executing software instructions such as operating the control plane. The processor 302 may be any custom made or commercially available processor, a central processing unit (CPU), an auxiliary processor among several processors associated with the control module 300, a semiconductor-based microprocessor (in the form of a microchip or chip set), or generally any device for executing software instructions. When the control module 300 is in operation, the processor 302 is configured to execute software stored within memory, to communicate data to and from the memory, and to generally control operations of the control module 300 pursuant to the software instructions.

The control module 300 may also include a network interface 304, a data store 306, memory 308, and the like, all of which are communicatively coupled therebetween and with the processor 302. The network interface 304 may be used to enable the control module 300 to communicate on a network, such as to communicate control plane information to other control modules, to communicate OAM&P data to the management system 260, and the like. The network interface 204 may include, for example, an Ethernet card (e.g., 10 BaseT, Fast Ethernet, Gigabit Ethernet, etc.) or a wireless local area network (WLAN) card (e.g., 802.11a/b/g/n). The network interface 304 may include address, control, and/or data connections to enable appropriate communications on the network. The data store 306 may be used to store data, such as control plane information, provisioning data, OAM&P data, etc. The data store 306 may include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 306 may incorporate electronic, magnetic, optical, and/or other types of storage media. The memory 308 may include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 308 may incorporate electronic, magnetic, optical, and/or other types of storage media. Note that the memory 308 may have a distributed architecture, where various components are situated remotely from one another, but may be accessed by the processor 302.

From a logical perspective, the control module 300 may include a state machine 310, a link database (DB) 312, a topology DB 314, and a circuit DB 316. The control module 300 may be responsible for all control plane processing. Generally, a control plane includes software, processes, algorithms, etc. that control configurable features of a network, such as automating discovery of network elements, capacity on the links, port availability on the network elements, connectivity between ports; dissemination of topology and bandwidth information between the network elements; calculation and creation of paths for connections; network level protection and restoration; OTN port multiplexing; and the like. In an exemplary embodiment, the control plane may utilize Automatically Switched Optical Network (ASON) as defined in G.8080/Y.1304, Architecture for the automatically switched optical network (ASON) (February 2005), the contents of which are herein incorporated by reference, and the like. In another exemplary embodiment, the control plane may utilize Generalized Multi-Protocol Label Switching (GMPLS) Architecture as defined in Request for Comments: 3945 (October 2004), the contents of which are herein incorporated by reference, and the like. In yet another exemplary embodiment, the control plane may utilize Optical Signaling and Routing Protocol (OSRP) from Ciena Corporation of Linthicum, Md. which is an optical routing protocol similar to PNNI (Private Network-to-Network Interface) and MPLS (Multiprotocol Label Switching). Those of ordinary skill in the art will recognize the network and the control plane may utilize any type control plane for controlling the network elements and establishing connections therebetween.

The state machine 310 may be configured to implement the behaviors described herein. The DBs 312, 314, 316 may be stored in the memory 308 and/or the data store 306. The link DB 312 includes updated information related to each link in a network. The topology DB 314 includes updated information related to the network topology, and the circuit DB 316 includes a listing of terminating circuits and transiting circuits at the network element 200 where the control module 300 is located including OTN Line ODUk mode management. The control module 300 may utilize control plane mechanisms to maintain the DBs 312, 314, 316. For example, HELLO messages or equivalent thereof may be used to discover and verify neighboring ports, nodes, protection bundles, boundary links, and the like. Also, the DBs 312, 314, 316 may share topology state messages to exchange information to maintain identical data. Collectively, the state machine 310 and the DBs 312, 314, 316 may be utilized to advertise topology information, capacity availability, provide connection management (provisioning and restoration), and the like. Each link in a network may have various attributes associated with it such as, for example, line protection, available capacity, total capacity, administrative weight, protection bundle identification, delay, designation of boundary link, and the like. The state machine 310 and the DBs 312, 314, 316 may be configured to provide automated end-to-end provisioning. For example, a route for a connection may be computed from originating node to terminating node and optimized using Dijkstra's Algorithm, i.e. shortest path from source to a destination based on the least administrative cost or weight, subject to a set of user-defined constraints.

Further, the control module 300 is configured to communicate to other control modules 300 in other network elements 200 on the network. This communication may be either in-band or out-of-band. Out-of-band signaling may use an overlaid Internet Protocol (IP) network such as, for example, User Datagram Protocol (UDP) over IP. In an exemplary embodiment, the present invention includes an in-band signaling mechanism utilizing OTN overhead. The General Communication Channels (GCC) defined by ITU-T G.709 are in-band side channels used to carry transmission management and signaling information within Optical Transport Network elements. The GCC channels include GCC0 and GCC1/2. GCC0 are two bytes within Optical Channel Transport Unit-k (OTUk) overhead that are terminated at every 3R (Re-shaping, Re-timing, Re-amplification) point. GCC1/2 are four bytes (i.e. each of GCC1 and GCC2 include two bytes) within Optical Channel Data Unit-k (ODUk) overhead. The GCC0, GCC1, GCC2 or GCC1+2 bytes may be used for in-band signaling or routing to carry control plane traffic. Based on the intermediate equipment's termination layer, different bytes may be used to carry control plane traffic. If the ODU layer has faults, it has been ensured not to disrupt the GCC1 and GCC2 overhead bytes and thus achieving the proper delivery control plane packets.

Variously, the OTN Line ODUk Mode Management systems and methods address OTN frame slip, ODUk in-band communication problems for OTU and ODUk overhead for the ODUk cross connect mode, real time performance problems of mode changes between ODUk CTP mode and ODUk TTP mode (and vice versa), and the like.

OTN Frame Slip Problem

In an exemplary embodiment, the OTN Line ODUk Mode Management systems and methods mitigate the OTU frame slip problem inherent to OTN networks. In particular, the OTN frame slip problem exists due to the nature of the OTU overhead framing source. As required in the OTN standard, the OTU overhead is framed off the Multiframe Alignment Signal (MFAS) defined for the ODUk overhead. When an OTN line terminates and originates the ODUk overhead, the MFAS frame is generated locally. When the ODUk is cross connected through the network element 200, the ODUk overhead, and therefore the OTU overhead, is timed from a source external to the network element 200.

As a result, a mode change from ODUk CTP (ODUk Connection) mode to ODUk TTP (ODUk Termination) mode causes a change in frame alignment. This change may cause brief framing errors in the OTU and ODUk overhead, including the GCC0 bytes, the GCC1 bytes, the GCC2 bytes, and any Tandem Connection Monitoring (TCM) bytes that the network element 200 may be originating or monitoring. The OTU and ODUk layers may experience bit errors or Out of Frame (OOF) conditions for a brief period; the duration and intensity of the error varies by hardware and implementation thereof

| Mode | ODU Frame Generated |
| --- | --- |
| ODUk CTP Path Monitoring (PM) Status (STAT) = AIS (Alarm Indication Signal) or OCI (Open Channel Indicator) | Locally |
| ODUk CTP PM STAT = NRM (pass through) or LCK | Externally |
| ODUk TTP PM STAT = DontCare, PT = DontCare | Locally |

In a mode change, for example, an ODUk may change from ODUk CTP PM STAT=OCI mode to ODUk TTP and vice versa. This results in a transition from locally framed ODU overhead to locally framed ODU overhead. Theoretically, this should not cause an OOF condition or any Section Monitoring (SM) or Path Monitoring (PM) layer defects at a peer network element 200; however, the hardware implementation may still cause a change to the ODU framing. A change in the source of the ODU overhead generation may lead to an OOF or bit error condition based on the hardware implementation. Also note that the source of the ODUk framing changes when in ODUk CTP mode based on the transmitted PM STAT value (if OCI is inserted) or the status of the framing from the backplane (if a valid cross connect is present). If a valid framing source is available (PM STAT=NRM) then the frame is generated externally (shifted to the framing received from the backplane). This shift from a locally generated ODUk frame to the framing received from the backplane may also result in an OOF or bit error condition on the line (this is the ODUk Cross Connect and In-Band Communication Problem discussed in the following section).

Additionally, the ODUk layer may report PM STAT AIS or PM BDI (Backward Defect Indicator) during this transition. The integrity of the OTU and ODUk overhead cannot be guaranteed to higher layer software until the ODUk PM STAT returns to NRM and the PM BDI is clear thereby leading to problems at the higher layer software, e.g. the control plane.

ODUk Cross Connect and In-Band Communication Problem

When an OTU is in ODUk cross connect mode and the ODUk PM STAT is NRM, then the framing and timing for the ODUk is provided externally to the network element 200. The transmitted OTU and ODU are framed from the signal received from the backplane of the network element 200. The integrity of the OTU and ODUk overhead cannot be guaranteed by the network element 200 because it is dependent on external behavior that can neither be controlled nor predicted by the local network element 200. As a result, an OTU TTP in ODUk mode is a poor selection for use by higher layer applications like the control plane for use in neighbor communication including but not limited to control plane routing, control plane signaling, and other in-band data communication like Gateway Network Element (GNE) or Multiprotocol Label Switching (MPLS).

Before a cross connect is created, the network element 200 may be configured to transmit ODUk OCI with a locally generated ODU frame. When the cross connect is provisioned, the network element 200 will establish the cross connect and change the PM STAT configuration from OCI insertion to pass through (PM STAT=NRM). The network element 200 will continue to source the ODU frame until a valid frame source is received from the backplane. Once a valid ODU frame source is received from the backplane, the frame alignment may shift resulting in a brief OOF or bit error condition. The timing of this transition cannot be controlled or predicted, and it may corrupt any in-band communication on the GCC bytes (GCC0, GCC1 and/or GCC2) at the time of the frame shift.

Figure 7:
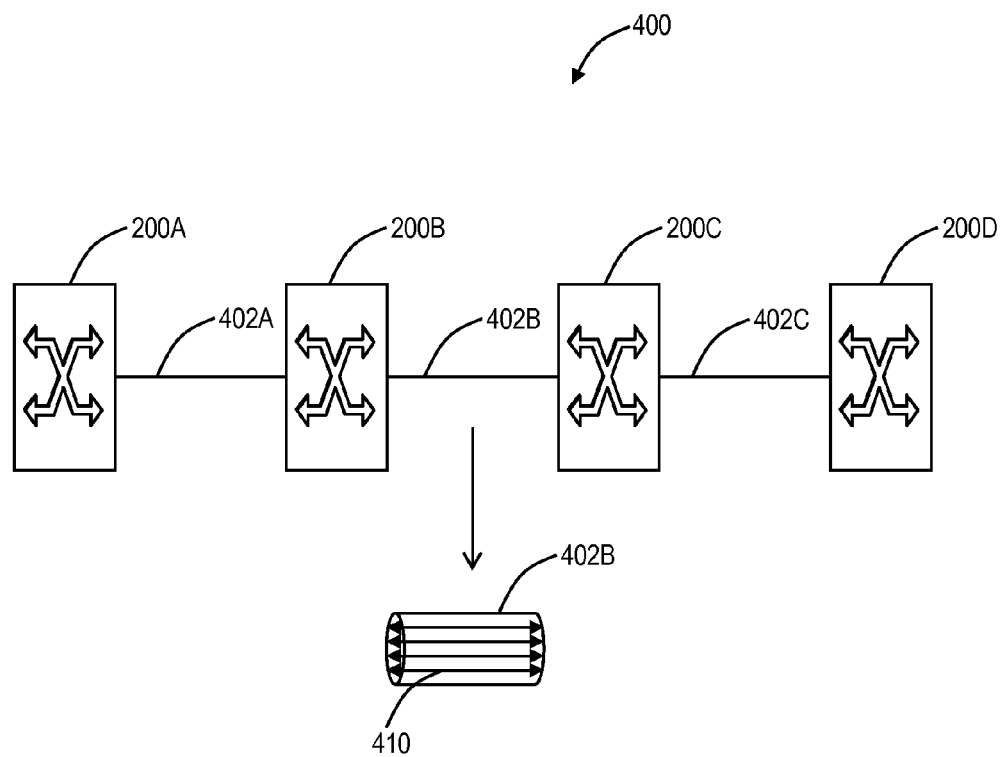
FIG. 7 is a network diagram of an exemplary OTN network with multiple network elements interconnected by OTU lines.

Referring to FIG. 7, in an exemplary embodiment, an exemplary OTN network 400 includes multiple network elements 200A, 200B, 200C, 200D interconnected by OTU lines 402A, 402B, 402C. Assume an OTU line 402B connects network elements 200B, 200C. In an exemplary embodiment, the OTU line 402B (and the OTU lines 402A, 402C) may include a link 410 with a plurality of OTU lines 420 contained therein. For example, the link 410 may be a Link Aggregation Group (LAG) that is treated by the control plane as a single line despite having a plurality of lines 420 contained therein. For example, the lines 402, 420 may include multiplexed ODUk lines such as described in FIGS. 1, 2, 3, and 4. The OTU line 402B, 420 may be carrying one or more ODUk sized Subnetwork Connections (SNCs), so the ODUk at network elements 200B, 200C is in an ODUk CTP mode. Also assume one of the lines 420 in the link 410 is used by a control plane on the network elements 200B, 200C for routing and signaling purposes, and an external event occurs outside the OTU line 402B (for example, a fiber break at OTU line 402A or OTU line 402C, failure at network elements 200A, 200B, etc.), then the link 410 and associated control plane lines 420 thereon may experience an OOF or bit error condition that causes messages between the network elements 200B, 200C to be dropped. This drop will be detected as a timeout by higher layer protocols such as the control plane, but the timers used to detect lost messages typically run with a one second granularity, far too long to meet the real time mesh performance requirements of a mesh network. Of note, the OTN Line ODUk mode management systems and methods described herein may be applied to the link 410 with the plurality of OTU lines 420 as well as to an OTU line 402 which is a non aggregated link (which may be thought of as a link 410 with a single line 420).

Real Time Behavior of ODUk CTP/ODUk TTP HW Transitions

When an OTU TTP is idle, the ODUk overhead is generated locally with the PM STAT set to OCI. The expected Payload Type (PT) is a don't-care value. When an OTU TTP is provisioned with an ODUk cross connect, the ODUk overhead is sourced outside the network element 200. The expected PT is a don't care value. The ODUk PM STAT is set to pass through, but it may be monitored. GCC1 and GCC2 may be terminated even though they are part of the ODUk overhead that would otherwise be passed-through untouched.

When an ODUk TTP is provisioned on the OTU TTP, the ODUk TTP is set to either step mode (PT 20) or flat mode (PT 21). In this case the network element 200 will generate the ODUk overhead locally including, but not limited to, GCC bytes and PM STAT.

The time to change modes between ODUk OCI CTP and ODUk TTP vary by hardware. There is a time penalty in terms of real time software time, including hardware wait states, as well as test set time during which the integrity of the OTU and ODUk overhead may be compromised.

As a result, the network element 200 software should minimize ODUk mode transitions as part of the process for protection applications like the control plane.

OTN Line ODUk Mode Management Overview

In various exemplary embodiments, OTN Line ODUk mode management systems and methods allow the network element 200 to control the default behavior of OTN lines operating in the network 300. The default behavior will not prevent a line from carrying traffic that requires a different mode (for example, a OTU-3 line configured for default ODU-3 TTP mode will be capable of carrying and advertising bandwidth for a ODU-3 cross connect), but a mode change may be required at the time a cross connect as applied (either a fast-create ODUk TTP for a line in ODUk CTP mode or a fast-delete ODUk TTP for a line in ODUk TTP mode). The objective is to minimize the mode changes as part of the cross connect creation when possible. A secondary objective is to keep at least one line in a link aggregation group for a control plane in an ODUk mode where the framing is generated by the network element 200 (i.e., ODUk TTP mode) so that the control plane routing and signaling messages may use a line that is not subject to framing errors that originate outside the control plane network. Another objective is to drastically lower traffic restoration time by having pre-provisioned CTPs and TTPs to which SNCs may be sent.

Figure 8:
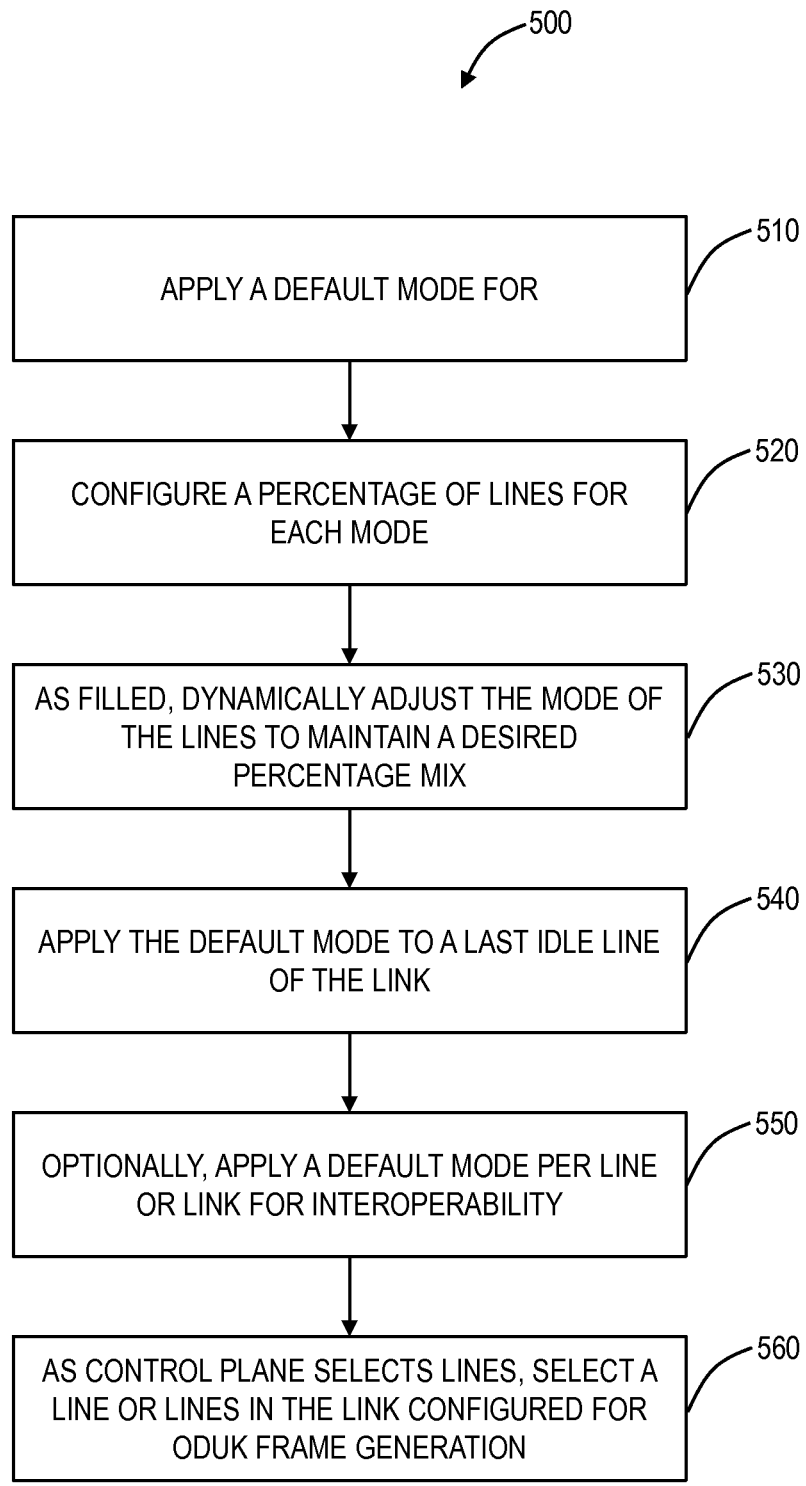
FIG. 8 is a flowchart of an OTN Line ODUk mode management method.

Referring to FIG. 8, in an exemplary embodiment, a flowchart illustrates an OTN Line ODUk mode management method 500. The mode management method 400 may be implemented on the network element 200 and/or in the network 300 for addressing inter alia the aforementioned limitations with OTN frame slip, ODUk Cross Connect and In-Band Communication, and Real Time Behavior of ODUk CTP/ODUk TTP HW Transitions. In particular, the mode management method 500 may be implemented at and between the network elements 200B, 200C on the OTU line 402B, the link 410, and/or the plurality of lines 420. First, a default mode is applied for OTU lines that may be configured by the user (step 510). Here, the network element 200 and/or the controller 300 may apply the default mode for OTU lines that may be configured by a user. Each OTU line rate may have different defaults (e.g., OTU3 lines may have a different default set by the user than OTU2 lines). In an exemplary embodiment, the modes may include ODUk CTP or ODUk TTP with the default being ODUk TTP.

Next, a percentage of control plane lines in a link (e.g., the link 410) are configured for each mode (step 520). This may be performed by the network element 200B, 200C with one acting as a master node to signal the desired line state for each line 420 to the neighbor node to ensure that lines are available for any SNC sized request that may arrive. As the lines 420 are filled, the modes of the lines 420 are dynamically adjusted on the OTU link 410 to maintain a desired percentage mix (from step 520) as lines in the OTU link 410 are assigned connections. For the last idle line 420 of the OTU link 410, the default mode (from step 510) is applied to that last idle line 420 (step 540). Note that this will not affect a dynamic fast TTP create or delete on the last line if required, but it will put the line 420 in the mode that is less likely to require a dynamic mode change due to a connection request. Optionally, a default mode may be applied per line 402, 420 or link 410 for interoperability (step 550). For example, interoperability between different equipment vendors, software, hardware, etc. may require a specific mode. As the control plane selects lines 402 and/or lines 420 in the link 410, the control plane selects a line or lines configured for ODUk frame generation (step 560). Importantly, the line or lines configured for ODUk frame generation are therefore not subject to errors introduced to the framing pattern from outside the network element 200.

The OTN Line ODUk mode management method 500 is configured to operate on the network element 200 and/or the controller 300 disposed therein. As such, it is anticipated not all of the network elements in a network may support the OTN Line ODUk mode management method 500. In such cases, the OTN Line ODUk mode management method 500 is configured to interoperate with non-supporting network elements. Further, the OTN Line ODUk mode management method 500 supports an upgrade scenario, in-service, for the network elements 200. For example, the OTN Line ODUk mode management method 500 may be included in a software load associated with the network element 200 and/or the controller 300 with the software load configured to be upgraded in-service.

Of note, while described in FIG. 8 with respect to a link and lines disposed thereon, the OTN Line ODUk mode management method 500 may apply to a single line which is not an aggregated link. Generally, the OTN Line ODUk mode management method 500 may approach the single line scenario similar to the link scenario with only one remaining line. With only one line, the OTN Line ODUk mode management method 500 may apply a default mode that allows the user to 'predict' the mode that the line will require (i.e. the user expects ODUk or ODUj traffic on the line).

In an exemplary operation of the OTN Line ODUk mode management method 500, assume an OTU3 line, changing modes, i.e. from an ODU3 TTP to an ODU3 CTP mode and vice versa, requires a timing reference change and the associated problems described herein. The link 410 may include ten lines 420 in a LAG between the network elements 200B, 200C. Using the OTN Line ODUk mode management method 500, the network elements 200B, 200C may initially keep half of the lines 420 as ODU3 TTP and half as ODU3 CTP. Channels are added to the lines 420 as follows—high order cross connects at native rate, i.e. ODU3, are provided to a line configured as ODU3 CTP. Low order channel requests, such as ODU0, ODU1, ODU2, ODUflex, etc. are bound to a line configured as ODU3 TTP, i.e. the low order requests will bind to a line already in ODU3 TTP mode thereby providing a faster setup. The network elements 200B, 200C negotiate with one another on management of the ten lines 420 as channels are added based on the OTN Line ODUk mode management method 500. Of note, the network elements 200B, 200C utilize a line 420 in an ODU3 TTP mode for control plane communication since such a mode is not subject to the timing errors and the like described herein. That is, the control plane communication may used GCC in-band communication over the line 420 in an ODU3 TTP mode. With the network elements 200B, 200C managing the lines 420 using the OTN Line ODUk mode management method 500, there will always be a trusted GCC communication thereon. Additionally, as SNCs are routed at one of the network elements 200B, 200C, the SNCs may be assigned, routed, etc. to a port with a corresponding mode, CTP, TTP, etc. for improved speed.

In an exemplary embodiment, the OTN Line ODUk mode management method 500 may be implemented in part or in whole through software associated with the network element 200 and/or the controller 300. The OTN Line ODUk mode management method 500 may primarily affects the following subsystems: 1) control plane, 2) facility, 3) Managed Object Framework (MOF), and 4) global defaults. The control plane subsystem will actively manage the ODUk mode for OTU TTPs that are configured for control plane routing and signaling. When the control plane needs to update the default mode for an idle OTU, the control plane will notify the facility subsystem which will apply the desired default idle mode to the TTP. The facility subsystem owns the configuration parameters for the OTU TTP. The facility subsystem will derive the idle mode behavior parameter for each OTU TTP and apply it to a data plane. The facility subsystem will take input from the control plane, facility TTP MOF, and Global Defaults to derive the actual value for the default ODUk mode for an idle OTU TTP. The MOF will manage the user view of the configuration parameters for the Facility TTP and the control plane. Global Defaults may add a new parameter that will be available to the facility subsystem when calculating the default ODUk mode for an idle OTU TTP. Of note, the OTN Line ODUk mode management method 500 may be implemented in the network elements 200 without significant impact on software, firmware, and/or hardware.

The following values may be set by the user. These will apply to all OTU TTPs in the mode selection algorithm.

| Attribute | Value | Network Element Level default |
| --- | --- | --- |
| Global Default for OTU2 line side | ODUk CTP or ODUk TTP | ODUk CTP |
| Globale Default for OTU2 drop side | ODUk CTP or ODUk TTP | ODUk CTP |
| Global Default for OTU3 line side | ODUk CTP or ODUk TTP | ODUk TTP |
| Global Default for OTU3 drop side | ODUk CTP or ODUk TTP | ODUk TTP |
| Global Default for OTU4 line side | ODUk CTP or ODUk TTP | ODUk TTP |
| Global Default for OTU4 drop side | ODUk CTP or ODUk TTP | ODUk TTP |
| Global OTU default mode enabled | True or False | True (if set to FALSE, all OTU TTPs will remain in ODUk CTP mode on creation). |

In operating the OTN Line ODUk mode management method 500, the following table illustrates exemplary attributes, values, and defaults:

| Attribute | Value | Default |
| --- | --- | --- |
| LineModeManagementEnabled | True or False | True |
| PercentageODUkTTP | [0 . . . 100] | 50 |
| LastOTU2 | ODUk CTP or ODUk TTP | ODUk TTP |
| LastOTU3 | ODUk CTP or ODUk TTP | ODUk TTP |
| Last OTU4 | ODUk CTP or ODUk TTP | ODUk TTP |

The foregoing table may be maintained by the control plane for each control plane line 402, 420. A LineModeManagementEnabled attribute is set to either true or false. This attribute will be set to true to indicate that the control plane will actively manage the ODUk mode for idle OTU lines 420 within the link 410. A PercentageODUkTTP attribute is set to an integer value between 0 and 100 inclusive. A value of 0 will force all idle OTU TTPs to ODUk CTP mode. A value of 100 will force all idle OTU TTPs to ODUk TTP mode. A value of 50 will force half to ODUk TTP mode and half to ODUk CTP mode. When rounding errors are encountered, the control plane may ensure that at least one line is in each mode (unless the percentage is 0 or 100). If at least one line is in each mode, and a rounding error exists, the control plane may set the extra line to the state specified by the LastOTU-X for the line rate. A LastOTU2 attribute specifies the mode of the last OTU2 in the link 420. If only one idle OTU2 line exists in the link, it will be set to either ODUk CTP mode or ODUk TTP mode based on this setting. A LastOTU3 attribute specifies the mode of the last OTU3 in the link 420. If only one idle OTU3 line exists in the link 420, it will be set to either ODUk CTP mode or ODUk TTP mode based on this setting. A LastOTU4 attribute specifies the mode of the last OTU4 in the link 420. If only one idle OTU4 line exists in the link, it will be set to either ODUk CTP mode or ODUk TTP mode based on this setting.

As described herein, the control plane may manage the ODU mode for all lines in a link aggregation group. For all lines, the control plane will select the mode based on the following selection criteria, listed in order of highest precedence to lowest: 1) Mode required by traffic (i.e. SNC) on the line if the line is not idle; 2) Mode selected by the control plane line balancing if line mode balancing is enabled; 3) Default mode specified for the line, if specified; 4) Default mode specified for the line type in the Global Defaults; and 5) ODU CTP mode. Note the foregoing is only applied if the feature is enabled.

Additionally, the control plane may be modified such that messages carry mode information per line 420 within a link 410 for the OTN Line ODUk mode management method 500. For example, such messages may include topology discovery messages, HELLO messages, and the like. For example, in OSRP, "Round-Robin" (RRTx and RRAck) packets to send local map information per link 410. This information is used to convey which line 420 within a link 410 is used for forwarding signaling packets and which is used for forwarding routing packets. RRAck packets are used as acknowledgement packets sent to acknowledge the receipt of a RRTx packet. These packets will be modified to carry the mode information per line within a link and will be sent as part of RRTx and RRAck packets. The master node may push the configured data through Tx message and slave node will acknowledge the condition once it informs the local facility on remote OTU mode changes. Same sequence number sent by master node in Tx.

In an exemplary embodiment, upgrading from a software release that does not support OTN Line ODUk Mode Management to a software release that does, the following configurations may be applied. The Global Defaults for a line side OTU2 shall be ODUk-CTP. The Global Defaults mode for a line side OTU3 shall be ODUk-TTP. The Global Defaults mode for a line side OTU4 shall be ODUk-TTP. The Global Defaults mode for a drop side OTU2 shall be ODUk-CTP. The Global Defaults mode for a drop side OTU3 shall be ODUk-CTP. The Global Defaults mode for a drop side OTU4 shall be ODUk-CTP. The Global Defaults OTN mode enabled setting will be true. The Facility Default for an OTU TTP shall be 'not specified'. The default for control plane line mode management enabled for a link shall be true. The default Mode Ratio for a Link Aggregation group shall be 50%. The mode for the last OTU2 in a control plane link shall be ODUk-TTP. The mode for the last OTU3 in a control plane link shall be ODUk-TTP. The mode for the last OTU4 in a control plane link shall be ODUk-TTP. A Master network element 200 for any link 420 will negotiate with a peer Slave network element 200 to update the applied mode for a line provided that: a) Both the Master Node and the Slave network element 200 support the control plane OTN Line ODUk Mode Management feature; b) the control plane line is idle (no cross connects); and c) the control plane line is operational. If the Master network element 200 for a control plane Line supports the OTN Line ODUk Mode Management feature and the Slave network element 200 does not, then the default mode for the line rate shall remain in effect until the Slave network element 200 is upgraded to a software release that supports the ODUk Mode Management feature. If the Slave OSRP network element 200 for a control plane line supports the OTN Line ODUk Mode Management feature and the Master network element 200 does not, then the default mode for the line rate shall remain in effect until the Master network element 200 is upgraded to a software release that supports the ODUk Mode Management feature.

It will be appreciated that some exemplary embodiments described herein may include one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the two approaches may be used. Moreover, some exemplary embodiments may be implemented as a computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), a Flash memory, and the like. In particular, the network elements 200 and/or the controller 300 may include some or all of the aforementioned components for implementation of the OTN line ODUk mode management systems and methods described herein.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. An Optical Transport Network (OTN) mode management system, comprising:
   a controller communicatively coupled to at least one OTN port, the controller is configured to operate an OTN line Optical channel Data Unit level k (ODUk) mode management system for the at least one OTN port, and the OTN line ODUk mode management system is configured to support different multiplexing scenarios and transitions associated therewith on the OTN port while preventing OTN frame slips comprising framing errors in OTN and ODUk overhead during mode changes and switches between internal and external timing references and maintaining in-band communications in OTN General Communications Channel (GCC) during the mode changes and switches.

2. The OTN mode management system of claim 1, wherein the transitions of the different multiplexing scenarios on the OTN port is provided on one of aggregated links and a single line.

3. The OTN mode management system of claim 1, wherein the OTN line ODUk mode management system is configured to pre-configure lines associated with the at least one OTN port thereby decreasing switch times associated therewith.

4. The OTN mode management system of claim 1, wherein the OTN line ODUk mode management system is configured to manage a mode of a plurality of lines associated with the at least one OTN port.

5. The OTN mode management system of claim 4, wherein the mode comprises one of a Connection Termination Point (CTP) and a Trail Termination Point (TTP).

6. The OTN mode management system of claim 5, wherein the controller is further configured to implement a control plane, and wherein the control plane selects at least one line of the plurality of lines for routing and signaling messages based on ODUk frame termination and generation thereon.

7. The OTN mode management system of claim 6, wherein the OTN line ODUk mode management system is configured to dynamically adjust the mode of the plurality of lines to maintain a desired percentage mix thereon.

8. The OTN mode management system of claim 7, wherein the OTN line ODUk mode management system is configured to apply a default mode to a last idle line of the plurality of lines.

9. The OTN mode management system of claim 4, wherein the controller is configured to perform a mode change on one of the plurality of lines while preventing an OTN frame slip and loss of in-band communication channels thereon.

10. A network element with Optical Transport Network (OTN) Line Optical channel Data Unit level k (ODUk) mode management, comprising:
at least one port with at least one line associated therewith;
a controller communicatively coupled to the at least one port; and
an OTN line ODUk mode management system executed on the controller for managing the least one line on the at least one port;
wherein the OTN line ODUk mode management system is configured to support different multiplexing scenarios on the least one port with continuity of a control plane during mode changes while preventing OTN frame slips comprising framing errors in OTN and ODUk overhead during mode changes and switches between internal and external timing references and maintaining in-band communications in OTN General Communications Channel (GCC) during the mode changes and switches.

11. The network element of claim 10, wherein the OTN line ODUk mode management system is configured to pre-configure the least one line associated with the at least one port thereby decreasing switch times associated therewith.

12. The network element of claim 10, wherein the OTN line ODUk mode management system is configured to manage a mode of the at least one line.

13. The network element of claim 10, wherein the mode comprises one of a Connection Termination Point (CTP) and a Trail Termination Point (TTP).

14. The network element of claim 13, wherein the controller is further configured to implement a control plane, and wherein the control plane selects at least one line of the at least one line for routing and signaling messages based on ODUk frame termination and generation thereon.

15. The network element of claim 14, wherein the OTN line ODUk mode management system is configured to dynamically adjust the mode of the at least one line to maintain a desired percentage mix thereon.

16. The network element of claim 15, wherein the OTN line ODUk mode management system is configured to apply a default mode to a last idle line of the at least one line.

17. The network element of claim 13, wherein the controller is configured to perform a mode change on one of the at least one line while preventing an OTN frame slip and loss of in-band communication channels thereon.

* * * * *